Jan. 2, 1940. B. S. HURDLE 2,185,668

FISH LURE

Filed May 17, 1937

Bonard S. Hurdle
INVENTOR

BY Victor J. Evans & Co.
ATTORNEYS

Patented Jan. 2, 1940

2,185,668

UNITED STATES PATENT OFFICE 2,185,668

FISH LURE

Bonard S. Hurdle, Chincoteague, Va.

Application May 17, 1937, Serial No. 143,163

1 Claim. (Cl. 43—42)

This invention relates to fish lures especially adapted for trolling and has for the primary object the provision of an efficient, durable and inexpensive device of this character wherein the major portion thereof will be flexible and when taken or struck by a fish will catch deep in the throat of a fish to assure against the fish getting loose or off of the hook and will have the advantages of a feathered lure with longer life.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation illustrating a fish lure constructed in accordance with my invention.

Figure 1:
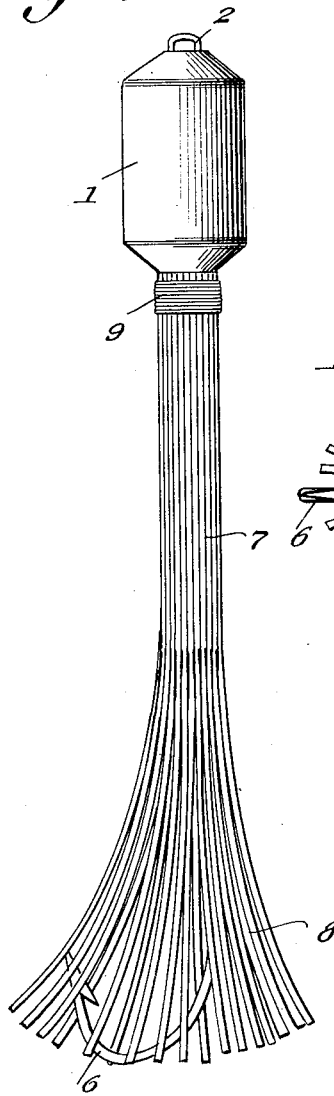
Figure 2:
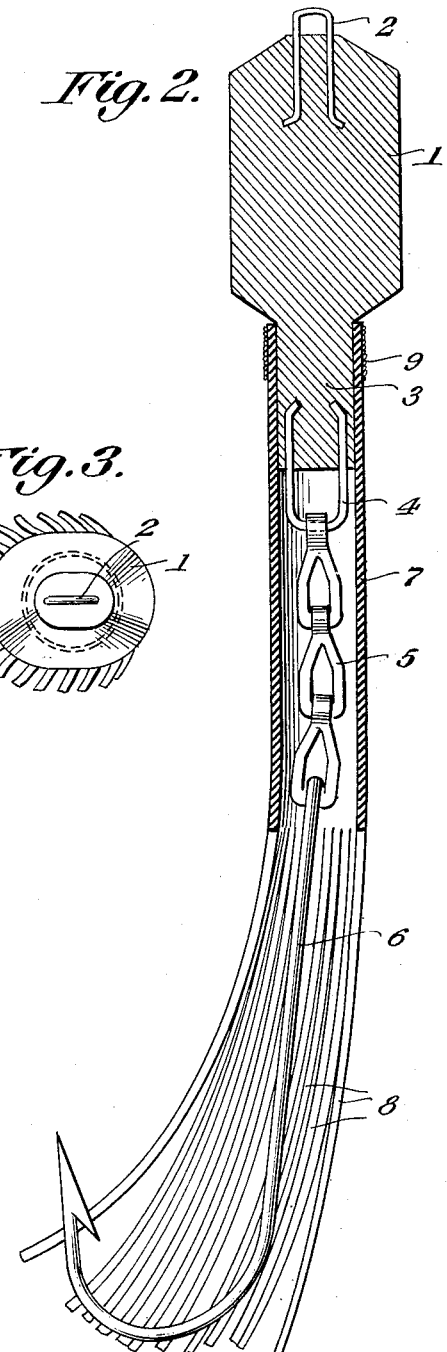
Figure 2 is a vertical sectional view illustrating the same.
Figure 3:
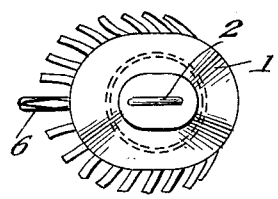
Figure 3 is an end view illustrating the device.

Referring in detail to the drawing, the numeral 1 indicates a body of a selected weight having secured to one end an eye 2 to which may be fastened a fish line. The other end of the body is reduced to form a cylindrical extension 3 on which is secured an eye 4 and attached to the latter is a chain or flexible element 5 of a selected length carrying at its free end a fish hook 6.

Mounted on the extension 3 is a tube 7 in which is confined the eye 4 and flexible element 5. A portion of the tube 7 is cut or severed to form a plurality of closely related strips 8 covering the fish hook 6. The tube 7 is flexibly constructed of rubber or any other material suitable for the purpose. The strips 8 being made from the tube 7 are flexible and will provide a concealment for the hook through which the hook may extend when taken or struck by a fish. The flexible elements 8 normally flare towards their free ends, as shown in Figure 1, so that when the device is drawn through the water fish will be attracted thereto by the strips 8 acting as bait. Wrappings 9 are employed for releasably securing the tube on the extension 3 of the body so that after use of the device over a period of time and the mutilation thereof by fish biting the same it can be readily removed and another tube adapted on the extension. While the body 1 forms a connection between the line and the flexible element 5 it also will act as a weight or sinker to cause the lure to travel at a selected desired distance below the surface of the water when trolling. During the use of the device the tube 7 will readily flex or give and the hook 6 permitted to follow the movement thereof by the flexible element 5.

What is claimed is:

A fish lure comprising in combination a body of a selected weight adapted to be connected to a fishing line, a flexuous element secured to one end of said body, a hook connected to the free end of said flexuous element, and a durable tube mounted on said end of said body and having elasticity and flexibility and enclosing the flexuous element and having a portion thereof severed to provide a plurality of closely related strips each free at one end and positioned about said hook to substantially conceal said hook and act as a lure for a fish and which may become easily disarranged to expose the hook to permit penetration of the latter by a fish when taken in the mouth of the fish.

BONARD S. HURDLE.